(No Model.)

J. E. ATWOOD.
TROLLEY WIRE HANGER.

No. 582,337. Patented May 11, 1897.

Witnesses:—
George Barry Jr.
R. B. Lenard

Inventor:—
John E. Atwood
by attorneys
Brown & Seward

UNITED STATES PATENT OFFICE.

JOHN E. ATWOOD, OF STONINGTON, CONNECTICUT.

TROLLEY-WIRE HANGER.

SPECIFICATION forming part of Letters Patent No. 582,337, dated May 11, 1897.

Application filed October 12, 1895. Serial No. 565,449. (No model.)

*To all whom it may concern:*

Be it known that I, JOHN E. ATWOOD, of Stonington, in the county of New London and State of Connecticut, have invented a new and useful Improvement in Trolley-Wire Hangers, of which the following is a specification.

My invention is an improvement in trolley-wire hangers, the object being to provide a suitable supporting device for the trolley-wire which will do away with the necessity of soldering any portion of the hanger to the wire, the said device being constructed in section, so that it may be readily removed from or attached to the wire.

A practical embodiment of my invention is represented in the accompanying drawings, in which—

Figure 1:
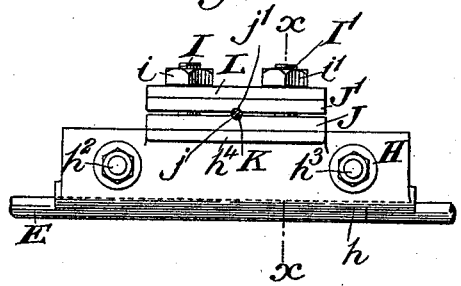
Figure 2:
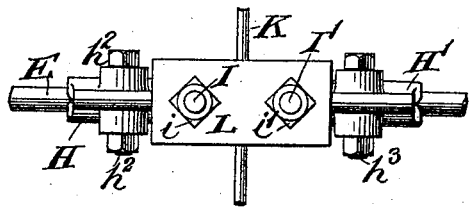
Figure 3:
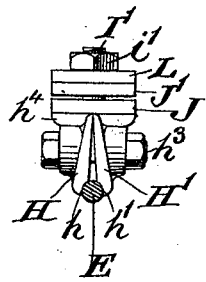
Figure 4:
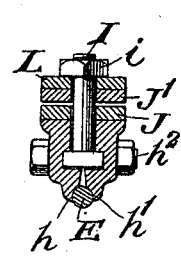

Figure 1 is a side view of the trolley-wire hanger. Fig. 2 is a top plan view of the same. Fig. 3 is an end view, and Fig. 4 is a transverse vertical section on the line $x\ x$ of Fig. 1.

The device which I have provided for supporting the trolley-wire E is as follows: Clamping-plates H H' extend longitudinally along the wire E and are provided along their lower edges with jaws $h\ h'$ for engaging a portion of the circumference of the wire E. Because of the trolley C being of plane cylindrical form these clamping-jaws may extend down to a line level with the lowermost point of the circumference of the wire E without interfering with the even running of the trolley C. Clamping-bolts $h^2\ h^3$ extend laterally through the plates H H' for clamping them securely to the wire E. The clamping-bolts $h^2\ h^3$ also serve to clamp the bolts I I', hereinafter to be mentioned, firmly between the clamping-plates H H'. The clamping-jaws $h\ h'$ of the clamping-plates H H' preferably do not quite come together at the top of the trolley-wire, so that as the clamping-bolts $h^2\ h^3$ are tightened they will firmly clamp the wire E.

Upwardly-extending bolts I I' have their heads seated in suitable recesses in the clamping-plates H H', with their screw-threaded shanks extending upwardly through the top of the said clamping-plates for securing the supporting-wire in position, as will hereinafter appear. These bolts I I' are locked in position when the clamping-bolts $h^2\ h^3$ are tightened.

A portion of the tops of the clamping-plates H H' is extended laterally to form a flattened or table portion $h^4$, upon which rests a plate of insulating material J, which plate has suitable openings therein, so that it can be placed in position with the screw-threaded shanks of the bolts I I' extending upward therethrough.

The supporting-wire (designated by K) extends transversely across the top of the insulating-plate J and over it is placed a second plate of insulating material J', so that the said wire is thoroughly insulated from the trolley-wire E. A metal plate L is inserted over the shanks of the bolts I I' down onto the insulating-plate J', and nuts $i\ i'$ are then screwed onto the screw-threaded shanks of the bolts I I', thereby clamping the supporting-wire K snugly in position.

The insulating-plates J J' may be provided with slight transverse grooves $j\ j'$, if so desired, for preventing the slipping of the supporting-wire K.

The supporting device or hanger as thus described can be quickly released from the trolley-wire when so desired, and may also be attached at any point along the wire where it is required, and does away entirely with the use of soldering.

The clamping-jaws may embrace more or less of the trolley-wire, as may be desired.

It is evident that slight changes might be resorted to in the form and arrangement of the several parts without departing from the spirit and scope of my invention. Hence I do not wish to limit myself strictly to the structure herein set forth; but

What I claim is—

In combination, a trolley-wire, clamping-plates extending along the wire and having jaws for partially embracing the same, bolts extending transversely through the plates for locking them to the wire, a supporting-wire, insulating-plates above and below the supporting-wire, a bearing-plate located above the upper insulating-plate and locking-bolts having their heads seated in the clamping-plates and engaging the said insulating and bearing plates for securing the supporting-wire and trolley-wire together, substantially as set forth.

JOHN E. ATWOOD.

Witnesses:
C. H. COWAN,
E. E. BRADLEY.